Nov. 17, 1942.                A. TANGEN                  2,302,509
                     POWER TAKE-OFF MECHANISMS
                     Filed Feb. 1, 1941          3 Sheets-Sheet 1
FIG.I.
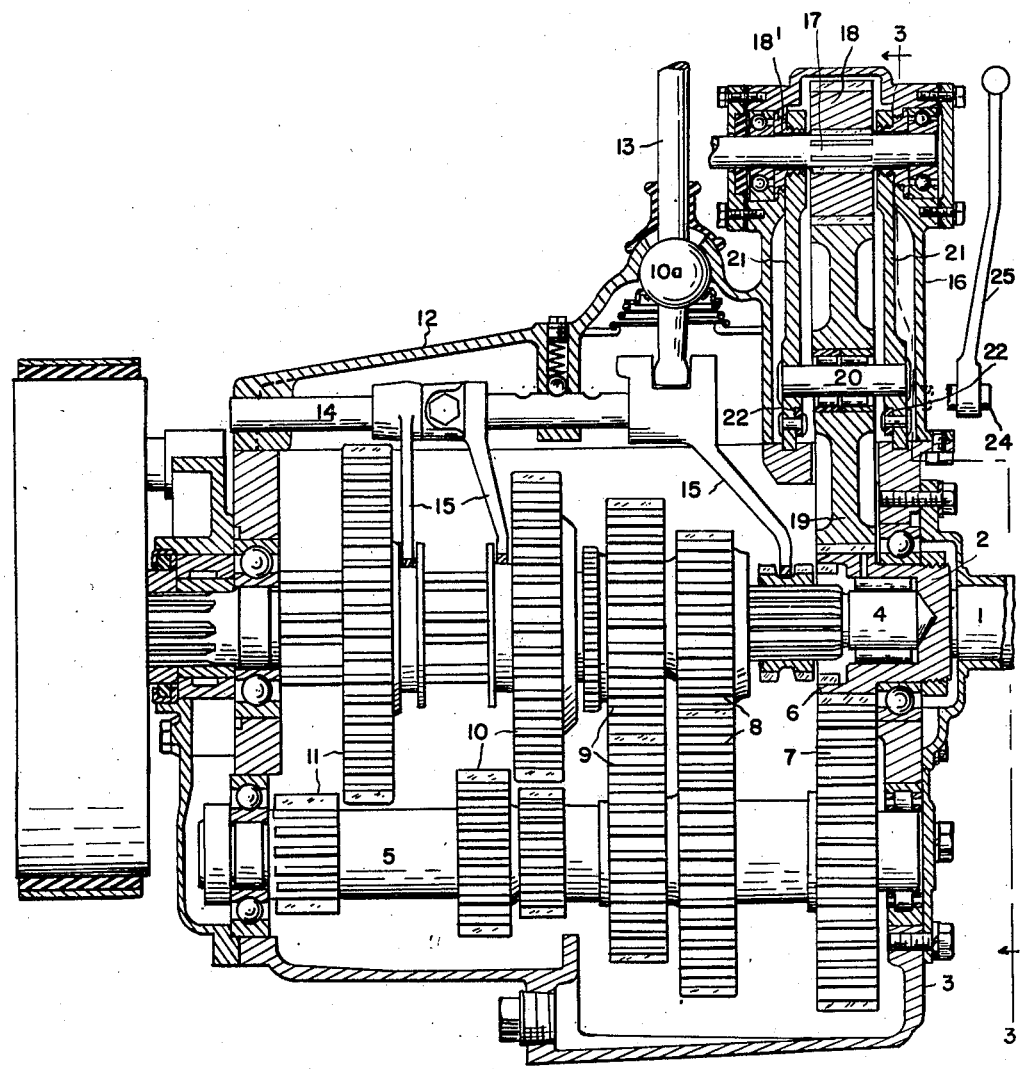
INVENTOR.
ANTHONY TANGEN
BY John C. Alexander
ATTORNEY.

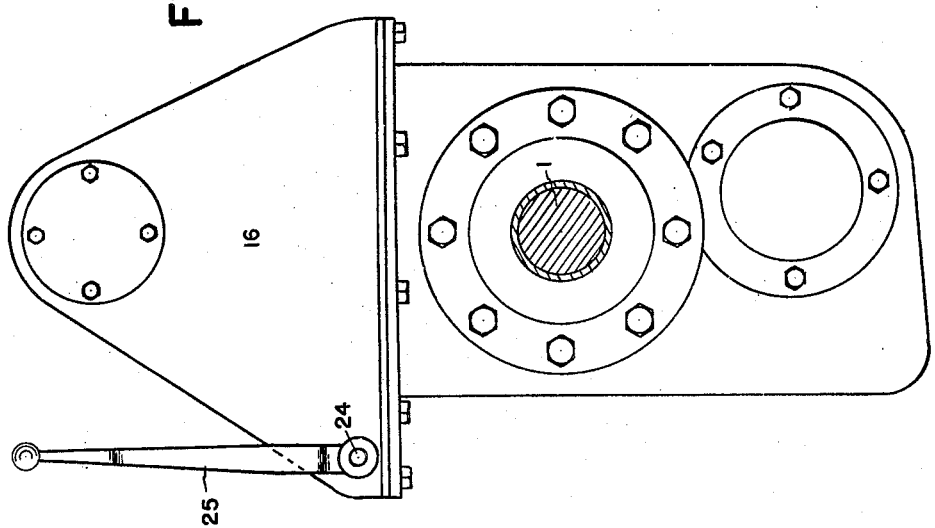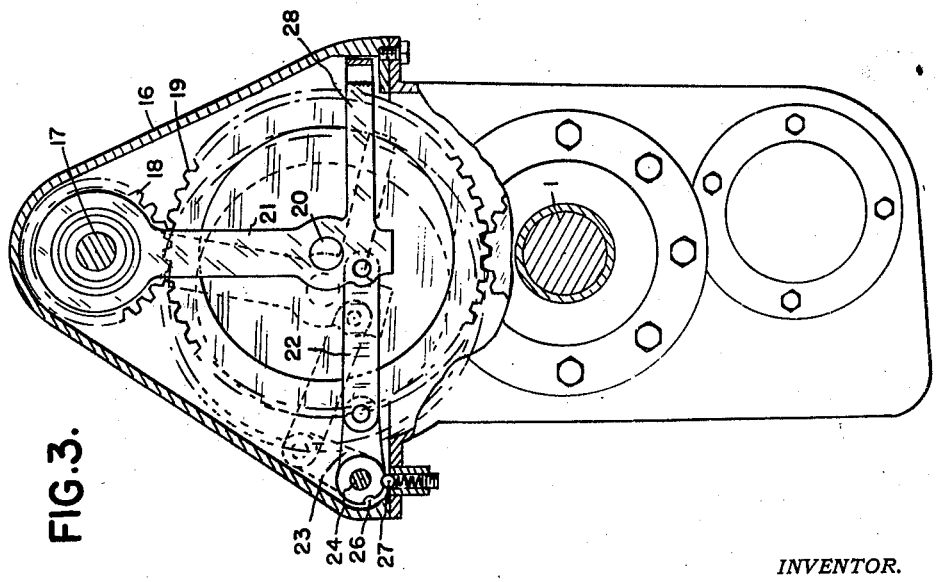

Patented Nov. 17, 1942

2,302,509

UNITED STATES PATENT OFFICE 2,302,509

POWER TAKE-OFF MECHANISMS

Anthony Tangen, Detroit, Mich.

Application February 1, 1941, Serial No. 376,952

5 Claims. (Cl. 74—11)

This invention relates to power take-off mechanisms for vehicles and particularly trucks or tractors.

An object of the invention is to provide a power take-off mechanism applicable to the power plant of a truck or tractor with minimum disturbance of the original installation, and minimum requirement of time and labor.

Another object is to provide a gear train through which power may be taken off from a vehicle power plant for other than vehicle drive purposes, and to adapt said gear train to surmount the selective gear transmission casing of the vehicle and to be driven by one of the transmission gears.

A further object is to provide an improved and simplified arrangement for connecting said gear train to or disconnecting it from said transmission.

These and various other objects are attained by the construction hereinafter described and illustrated in the accompanying drawings, wherein:

Fig. 1 is a longitudinal vertical sectional view of a vehicle selective gear transmission, showing my improved power take-off mechanism applied thereto.

Fig. 2 is an end view of the same.

Fig. 3 is a view similar to Fig. 2 but partially in section on the line 3—3 of Fig. 1.

Figure 4:
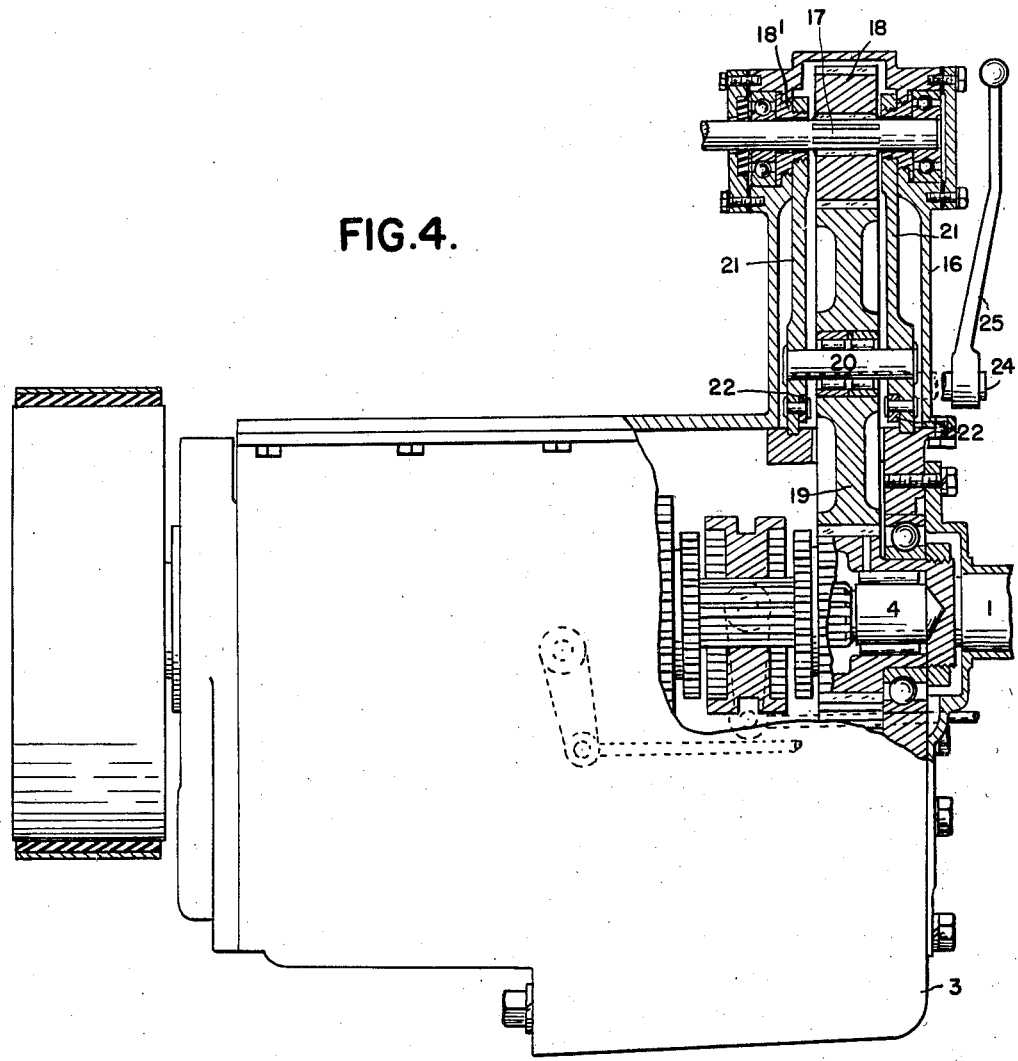
Fig. 4 is a side elevational view in partial section of a somewhat different type of selective gear transmission with my power take-off gear train applied thereto.

In these views, the reference character 1 designates the engine-driven shaft of a motor vehicle and 2 a hollow head terminally carried by said shaft within the usual selective gear transmission casing 3. Within said casing are disposed a shaft 4 aligned with the shaft 1 and a co-acting jack-shaft 5. The head 2 comprises a gear 6 meshed with a gear 7 to drive the jack-shaft, and train of gears 8, 9, 10, and 11 provide for selective drives to the shaft 4 from the jack-shaft. Universally pivoted at 10a on the cover 12 of the casing 3 is a lever 13 actuable to select a desired drive and taking effect on the transmission gears through the usual slide rod or slides rods 14 and yoke arms 15.

Rigidly carried by the cover 12 and preferably integral therewith is a housing 16 having a power take-off shaft 17 journaled in its upper portion. Said housing receives a train of gears driving said shaft from one of the transmission gears, the gear train illustrated comprising a gear 18 splined on the shaft 17 and an underlying gear 19 meshed with the gear 18 and with the transmission gear 6, the arrangement being such that the gears 6 and 19 are properly engaged when the cover 12 is properly applied to the casing. The gear 19 is journaled on a shaft 20 having its ends mounted in the lower extremities of a pair of arms 21, disposed at opposite sides of the gear train 18 and 19. The upper ends of said arms are pivotally mounted coaxially with the power take-off shaft on bushings 18', set into the housing 16. When the arms 21 are substantially vertical, as shown in full lines in Fig. 3, the gear 19 has driven engagement with the transmission gear 6. The housing 16 sufficiently overhangs one side of the casing 3 to afford a swinging movement of the gear 19 about the power take-off shaft as an axis, whereby it may be disengaged from the gear 6, as appears in dash lines in Fig. 3. For actuating the gear 19 in its described swinging movement, a pair of link bars 22 are extended from the lower ends of the arms 21 to a pair of arms 23 fixed on a rock-shaft 24 journaled in the overhanging portion of the housing. A lever 25 fixed on said rock-shaft exteriorly of the casing, acts through the arms 23 and link bars 22 to establish either described positions of the gear 19. Suitable provision is made for holding the gear in either position, as by forming two circumferentially spaced notches 26 in the shaft-engaging end of the arm 23, for receiving a spring-pressed ball detent 27 in the limiting positions of said arm.

Primary advantage of adapting the gear 19 to be swung as described for establishing or cutting off a drive to the shaft 17 lies in the compact nature of the mechanism required, as compared to common clutch arrangements.

Preferably each arm 21 has a bar 28 projecting integrally from its lower end in a direction opposite to that of the link bars 22. These terminally engage the housing 16 to establish the driven position of the gear 19.

A highly desirable feature of the described power take-off provision is that it requires no disturbance of the original shafting and gearing serving a vehicle drive purpose. Furthermore said provision is readily applicable to the transmission of almost any standard road or farm vehicle, being installed by merely replacing the standard cover of the transmission casing by the cover 12, on which the take-off shaft and its driving gears are installed.

By locating the housing 16 upon that end of the cover 12 corresponding to the drive-applying end of the transmission, any interference of said housing and the gears therein with the control mechanism for the transmission gears is avoided.

It is a vital feature of the invention that a drive may be transmitted through the transmission gearing while the take-off shaft is driven, or the latter may be driven while the transmission is in neutral and hence not functioning, or the transmission may function while the take-off shaft is idle. Thus the arrangement is afforded a maximum range of use.

The construction shown in Fig. 4 conforms to the description already given except as regards omission of the lever 13, slide rods 14 and yoke arms 15. The purpose of this view is to show that the invention is applicable to transmissions using the gear shifting arrangements other than that shown in Fig. 1, as for example, the type (not shown) in which an arm or lever on the steering column serves to shift the gears.

What I claim is:

1. The combination with a selective gear transmission, of a power take-off shaft journaled in an elevated relation to said transmission, a gear train comprising an initial gear meshed with a gear of said transmission, a shaft journaling said initial gear, a pair of arms pivoted coaxially with the power take-off shaft and mounting the shaft journaling said initial gear, and means for swinging said arms to a position disengaging the initial gear from the transmission.

2. In the combination as set forth in claim 1, means for retaining said arms in said position.

3. The combination as set forth in claim 1, the last named means comprising a rock-shaft, a lever for rocking said shaft, an arm on said shaft and a link connected at one end to the last-mentioned arm and effective at its other end on the lower portion of one of the said paired arms.

4. The combination with a selective gear transmission and its casing, said casing comprising a removable cover forming a housing, a power take off shaft journaled in the upper portion of said housing, a gear train installed in said housing for driving said shaft, including an initial gear arranged to mesh with a gear of said transmission when the cover is applied to the casing, means journaling said initial gear for bodily movement relative to the housing to disengage it from the transmission, and means for effecting said bodily movement including an actuating member exteriorly mounted on the cover.

5. The combination with a selective gear transmission, of a power take-off shaft journaled in an elevated relation to said transmission, a gear train in driving relation to said shaft comprising an initial gear meshed with a gear of said transmission, a shaft journaling said initial gear, a mounting for the last mentioned shaft, pivoted to swing about an axis parallel to said shaft and adapted to thereby disengage said initial gear from the transmission, and means for manually swinging said pivoted mounting to engage said initial gear with or disengage it from the transmission.

ANTHONY TANGEN.